US008726176B2

(12) United States Patent
Beringer

(10) Patent No.: US 8,726,176 B2
(45) Date of Patent: May 13, 2014

(54) ACTIVE BUSINESS CLIENT

(76) Inventor: Joerg Beringer, Los Altos, CA (US)

(*) Notice: Subject to any disclaimer, the term of this patent is extended or adjusted under 35 U.S.C. 154(b) by 69 days.

(21) Appl. No.: 13/358,725

(22) Filed: Jan. 26, 2012

(65) Prior Publication Data
US 2012/0124133 A1 May 17, 2012

Related U.S. Application Data

(63) Continuation of application No. 12/033,361, filed on Feb. 19, 2008, now Pat. No. 8,127,237.

(60) Provisional application No. 60/974,735, filed on Sep. 24, 2007.

(51) Int. Cl.
G06F 3/00 (2006.01)
G06F 9/44 (2006.01)
G06F 9/46 (2006.01)
G06F 13/00 (2006.01)
G06F 3/0481 (2013.01)
G06F 13/40 (2006.01)

(52) U.S. Cl.
CPC .............. *G06F 8/38* (2013.01); *G06F 3/0481* (2013.01); *G06F 13/4027* (2013.01)
USPC ........................ 715/762; 719/328; 710/100

(58) Field of Classification Search
USPC ...................... 715/762; 719/328; 710/100
See application file for complete search history.

(56) References Cited

U.S. PATENT DOCUMENTS

| 4,617,643 | A | 10/1986 | Klock et al. |
| 4,777,485 | A | 10/1988 | Costello |
| 4,845,644 | A | 7/1989 | Anthias et al. |
| 5,040,131 | A | 8/1991 | Torres |
| 5,197,124 | A | 3/1993 | Busboom et al. |
| 5,201,033 | A | 4/1993 | Eagen et al. |
| 5,208,903 | A | 5/1993 | Curry |
| 5,214,756 | A | 5/1993 | Franklin et al. |
| 5,255,358 | A | 10/1993 | Busboom et al. |
| 5,295,241 | A | 3/1994 | Eagen et al. |
| 5,345,553 | A | 9/1994 | Busboom et al. |
| 5,388,198 | A | 2/1995 | Layman et al. |
| 5,430,836 | A | 7/1995 | Wolf et al. |

(Continued)

OTHER PUBLICATIONS

Non-Final Office Action for U.S. Appl. No. 11/956,086 Mailed Jun. 8, 2010, 19 Pages.

(Continued)

*Primary Examiner* — David Phantana Angkool
(74) *Attorney, Agent, or Firm* — Blakely Sokoloff Taylor & Zafman, LLP

(57) ABSTRACT

Methods and apparatuses enable generation of and consumption of business context data. A server generates business context data that describes a resource, a view, and actionable context data related to a business scenario. The business context data is not specific to any particular UI capability of the client device, and may include tittle or no UI information. The server transmits the business context data to a client device that has an active client. The active client identifies one or more UI capabilities of the client device and generates a UI component based on the business scenario and the UI capabilities. The UI component enables functionality in the client device related to execution of the actionable context data. In one embodiment, the active client enables predictive deployment of services on the client device based on an understanding of the business scenario.

15 Claims, 7 Drawing Sheets

(56) References Cited

U.S. PATENT DOCUMENTS

| | | | |
|---|---|---|---|
| 5,461,716 A | 10/1995 | Eagen et al. | |
| 5,467,441 A | 11/1995 | Stone et al. | |
| 5,517,405 A * | 5/1996 | McAndrew et al. | 706/45 |
| 5,596,690 A | 1/1997 | Stone et al. | |
| 5,652,851 A | 7/1997 | Stone et al. | |
| 5,682,169 A | 10/1997 | Botterill et al. | |
| 5,710,896 A | 1/1998 | Seidl | |
| 5,727,141 A | 3/1998 | Hoddie et al. | |
| 5,729,704 A | 3/1998 | Stone et al. | |
| 5,754,857 A | 5/1998 | Gadol | |
| 5,826,239 A | 10/1998 | Du et al. | |
| 5,923,330 A | 7/1999 | Tarlton et al. | |
| 5,940,075 A | 8/1999 | Mutschler et al. | |
| 5,991,733 A * | 11/1999 | Aleia et al. | 705/7.13 |
| 6,073,109 A | 6/2000 | Flores et al. | |
| 6,100,885 A | 8/2000 | Donnelly et al. | |
| 6,137,484 A | 10/2000 | Hoddie et al. | |
| 6,209,004 B1 | 3/2001 | Taylor | |
| 6,282,531 B1 * | 8/2001 | Haughton et al. | 706/50 |
| 6,343,271 B1 * | 1/2002 | Peterson et al. | 705/4 |
| 6,434,628 B1 | 8/2002 | Bowman-Amuah | |
| 6,640,238 B1 | 10/2003 | Bowman-Amuah | |
| 6,968,553 B1 | 11/2005 | Theeten | |
| 6,973,618 B2 | 12/2005 | Shaughnessy et al. | |
| 6,988,272 B1 | 1/2006 | Iwao et al. | |
| 7,000,219 B2 | 2/2006 | Barrett et al. | |
| 7,096,222 B2 | 8/2006 | Kern et al. | |
| 7,100,195 B1 | 8/2006 | Underwood | |
| 7,167,844 B1 | 1/2007 | Leong et al. | |
| 7,219,107 B2 | 5/2007 | Beringer | |
| 7,412,658 B2 | 8/2008 | Gilboa | |
| 7,425,582 B2 | 9/2008 | Baran, Jr. et al. | |
| 7,428,582 B2 | 9/2008 | Bean et al. | |
| 7,451,152 B2 | 11/2008 | Kraft et al. | |
| 7,603,266 B2 | 10/2009 | Ramanathan | |
| 7,698,656 B2 | 4/2010 | Srivastava | |
| 7,769,619 B1 * | 8/2010 | Krysinski et al. | 705/7.13 |
| 7,860,946 B1 | 12/2010 | Bulleit et al. | |
| 7,876,779 B2 | 1/2011 | Wilson | |
| 7,917,378 B2 * | 3/2011 | Fitzgerald et al. | 705/4 |
| 7,925,527 B1 * | 4/2011 | Flam | 705/7.26 |
| 8,127,237 B2 | 2/2012 | Beringer | 715/762 |
| 8,135,817 B2 * | 3/2012 | Motoyama | 709/223 |
| 8,271,882 B2 * | 9/2012 | Botscheck et al. | 715/738 |
| 8,321,243 B1 * | 11/2012 | Harris et al. | 705/3 |
| 8,489,415 B1 * | 7/2013 | Ringold | 705/2 |
| 8,526,925 B2 * | 9/2013 | Zellner et al. | 455/415 |
| 2002/0063734 A1 | 5/2002 | Khalfay et al. | |
| 2002/0107752 A1 | 8/2002 | Rivera et al. | |
| 2003/0023472 A1 | 1/2003 | Lee et al. | |
| 2003/0036925 A1 | 2/2003 | Miller | |
| 2003/0046639 A1 | 3/2003 | Fai et al. | |
| 2003/0172343 A1 | 9/2003 | Leymaster et al. | |
| 2003/0182458 A1 | 9/2003 | Ali et al. | |
| 2003/0217333 A1 | 11/2003 | Smith et al. | |
| 2004/0015893 A1 | 1/2004 | Banavar et al. | |
| 2004/0046789 A1 | 3/2004 | Inanoria | |
| 2004/0225571 A1 | 11/2004 | Urali | |
| 2004/0236858 A1 | 11/2004 | Schwartz | |
| 2004/0261017 A1 | 12/2004 | Perry | |
| 2005/0027544 A1 | 2/2005 | Newstead et al. | |
| 2005/0027559 A1 | 2/2005 | Rajan et al. | |
| 2005/0203757 A1 | 9/2005 | Lei et al. | |
| 2005/0257139 A1 | 11/2005 | Burst et al. | |
| 2006/0047709 A1 | 3/2006 | Belin et al. | |
| 2006/0085245 A1 | 4/2006 | Takatsuka et al. | |
| 2006/0101321 A1 | 5/2006 | Friedrichowitz et al. | |
| 2006/0133412 A1 | 6/2006 | Callaghan | |
| 2006/0149743 A1 | 7/2006 | Mouline et al. | |
| 2006/0190544 A1 | 8/2006 | Chikirivao et al. | |
| 2006/0200792 A1 | 9/2006 | Hagstrom et al. | |
| 2006/0224432 A1 | 10/2006 | Li | |
| 2006/0230348 A1 | 10/2006 | Fahmy | |
| 2006/0244089 A1 | 11/2006 | Sawada et al. | |
| 2006/0247965 A1 | 11/2006 | Griffith et al. | |
| 2006/0277089 A1 | 12/2006 | Hubbard et al. | |
| 2007/0033194 A1 | 2/2007 | Srinivas et al. | |
| 2007/0033571 A1 | 2/2007 | Moore et al. | |
| 2007/0054627 A1 | 3/2007 | Wormald | |
| 2007/0055560 A1 | 3/2007 | Quinn, Jr. | |
| 2007/0150480 A1 | 6/2007 | Hwang et al. | |
| 2007/0192630 A1 | 8/2007 | Crane et al. | |
| 2007/0239503 A1 | 10/2007 | Bhatnagar et al. | |
| 2007/0299828 A1 | 12/2007 | Lewis et al. | |
| 2007/0300185 A1 | 12/2007 | Macbeth et al. | |
| 2008/0004725 A1 | 1/2008 | Wacker | |
| 2008/0082649 A1 | 4/2008 | Gazier et al. | |
| 2008/0140759 A1 | 6/2008 | Conner et al. | |
| 2008/0215757 A1 | 9/2008 | Hellstrom | |
| 2008/0313650 A1 | 12/2008 | Arnquist et al. | |
| 2009/0031284 A1 | 1/2009 | Shenfield et al. | |
| 2009/0044236 A1 | 2/2009 | Bendiabdallah et al. | |
| 2009/0051701 A1 | 2/2009 | Fleming | |
| 2009/0063522 A1 | 3/2009 | Fay et al. | |
| 2009/0083058 A1 | 3/2009 | Beringer et al. | |
| 2009/0106645 A1 | 4/2009 | Knobel | |
| 2009/0112924 A1 | 4/2009 | Harris et al. | |
| 2009/0158268 A1 | 6/2009 | Pichetti et al. | |
| 2009/0171909 A1 | 7/2009 | Bank et al. | |
| 2009/0235167 A1 | 9/2009 | Boyer et al. | |
| 2009/0240840 A1 | 9/2009 | Habben et al. | |
| 2009/0241015 A1 | 9/2009 | Bender et al. | |
| 2009/0260022 A1 | 10/2009 | Louch et al. | |
| 2010/0049628 A1 | 2/2010 | Mannava et al. | |
| 2010/0050097 A1 | 2/2010 | McGreevy et al. | |
| 2010/0064229 A1 | 3/2010 | Lau et al. | |
| 2010/0082641 A1 | 4/2010 | Rinckes et al. | |
| 2010/0125477 A1 | 5/2010 | Mousseau et al. | |
| 2010/0174991 A1 | 7/2010 | Andersen et al. | |
| 2010/0251133 A1 | 9/2010 | Beringer et al. | |

OTHER PUBLICATIONS

Office Action from U.S. Appl. No. 12/128,453 Mailed Oct. 4, 2010, 23 Pages.

Final Office Action for U.S. Appl. No. 11/956,086 Mailed Nov. 24, 2010, 26 Pages.

Non-Final Office Action for U.S. Appl. No. 11/803,760 Mailed Dec. 7, 2010, 24 Pages.

Office Action from U.S. Appl. No. 12/128,453 Mailed Jan. 10, 2011, 17 pages.

Final Office Action for U.S. Appl. No. 12/128,453, Mailed Jan. 10, 2011, 17 pages.

Non-Final Office Action for U.S. Appl. No. 12/033,361, Mailed Feb. 17, 2011, 13 pages.

Restriction Requirement for U.S. Appl. No. 11/803,831 Mailed Mar. 25, 2011, 11 pages.

Non-Final Office Action for U.S. Appl. No. 12/411,216, Mailed Mar. 28, 2011, 16 pages.

Non-Final Office Action for U.S. Appl. No. 11/803,751, Mailed Mar. 15, 2011, 11 pages.

Final Office Action for U.S. Appl. No. 11/803,760, Mailed Apr. 1, 2011, 26 pages.

Non-Final Office Action for U.S. Appl. No. 11/803,760, Mailed Jul. 20, 2011, 26 pages.

Final Office Action for U.S. Appl. No. 12/033,361, Mailed Aug. 3, 2011, 7 pages.

Final Office Action for U.S. Appl. No. 11/803,751, Mailed Aug. 17, 2011, 16 pages.

Notice of Allowance for U.S. Appl. No. 12/128,453, Mailed Aug. 30, 2011, 14 pages.

Final Office Action from U.S. Appl. No. 11/803,831 mailed Sep. 20, 2011, 19 pages.

Final Office Action for U.S. Appl. No. 12/411,216, Mailed Oct. 21, 2011, 21 pages.

Notice of Allowance for U.S. Appl. No. 12/033,361, Mailed Oct. 27, 2011, 6 pages.

Final Office Action for U.S. Appl. No. 11/803,760, Mailed Oct. 31, 2011, 22 pages.

Final Office Action for U.S. Appl. No. 12/411,231, Mailed Nov. 9, 2011, 38 pages.

(56) References Cited

OTHER PUBLICATIONS

Notice of Allowance for U.S. Appl. No. 11/956,086, Mailed Feb. 2, 2012.
Office Action from U.S. Appl. No. 12/411,216 Mailed Apr. 5, 2012, 21 pages.
Office Action from U.S. Appl. No. 12/411,231 Mailed Mar. 28, 2012, 37 pages.
Notice of Allowance from U.S. Appl. No. 11/956,086 Mailed Feb. 2, 2012, 8 pages.
Office Action from U.S. Appl. No. 11/803,831 Mailed Apr. 17, 2012, 19 pages.
Office Action from U.S. Appl. No. 11/803,760 Mailed Oct. 15, 2010, 8 pages.
Advisory Action From U.S. Appl. No. 11/803,760 Mailed May 31, 2011, 3 pages.
Advisory Action from U.S. Appl. No. 11/956,086 Mailed Feb. 7, 2011, 4 pages.
Final Office Action from U.S. Appl. No. 12/411,231 Mailed Jul. 17, 2012, 46 pages.
Final Office Action for U.S. Appl. No. 12/411,2161, Mailed Dec. 4, 2012, 22 pages.
Non-Final Office Action for U.S. Appl. No. 12/128,453, Mailed Apr. 26, 2011, 17 pages.
Non-Final Office Action for U.S. Appl. No. 11/803,831, Mailed May 16, 2011, 20 pages.
Non-Final Office Action for U.S. Appl. No. 12/411,231, Mailed Jun. 9, 2011, 33 pages.
Cardoso, Jorge, "Semantic Web Services: Theory, Tools, and Applications", Information Science Reference, Hershey, NY, USA, 2007, (2007), 1-43 and 191-239.
Davies, John, et al., "Towards the Semantic Web Ontology-Driven Knowledge Management", John Wiley & Sons, LTD, Chichester, England, 2003, (2003), 1-12 and 91-115.
Fingar, "Missing Link", bpminstitute.org, (Jan. 5, 2006), 1.
Fingar, "The Coming IT Flip Flop: And the Emergence of Human Interaction Management Systems", BPTrends, (Nov. 2005), 1-5.
Harrison-Broninski, "Human Interaction: The Missing Link in BPM (Part 1)", ebizQ.net, (Apr. 3, 2005), 1-3.
Harrison-Broninski, "Human Interaction: The Missing Link in BPM (Part II)", ebizQ.net, (Apr. 10, 2005), 1-3.
Hollingsworth, David, "Workflow Management Coalition The Workflow Reference Model", Document Number TC00-1003, Document Status—Issue 1.1, Jan. 19, 1995, 55 pages.
Horton, Ivor, "Ivor Horton's Beginning Visual C++ 2005", Published by Wiley Publishing, Inc. Copyright 2006.
Shadbolt, Nigel, et al., "The Smeantic Web Revisited", IEEE Intelligent Systems May/Jun. 2006; Retrieved on Mar. 1, 2009 from http://eprints.ecs.soton.ac.uk/12614/01/Semantic_Web_Revisited.pdf Published by the IEEE Computer Society, 2006, pp. 96-101.
Spivack, Nigel, "Making Sense of the Semantic Web", Nov. 2007; Retrieved from the Web on Mar. 11, 2009: http://novaspivack.typepad.com/nova_spivacks_weblog/files/nova_spivack_semantic_web_talk.ppt, 36 pages.
Roper, Chris, GDC 09: OnLive Introduces The Future of Gaming, Next-generation "cloud" technology could change videogames forever, http://www.ign.com/articles/2009/03/24/gdc-09-onlive-introduces-the-future-of-gaming, Mar. 23, 2009, 6 pages.
Office Action from U.S. Appl. No. 12/411,231 mailed Jul. 16, 2013, 46 pages.

\* cited by examiner

ACTIVE BUSINESS CLIENT

This application is a Continuation of, and claims the benefit of priority of U.S. patent application Ser. No. 12/033,361 filed Feb. 19, 2008, now U.S. Pat. No. 8,127,237 and further claims the benefit of priority of U.S. Provisional Application No. 60/974,735 filed Sep. 24, 2007, entitled Active Business Clients and Predictive Deployment.

FIELD

Embodiments of the invention relate to client-server interaction, and more particularly to generation and processing of business context data.

BACKGROUND

Work performed with electronic devices is generally performed in an interactive way, where the electronic device (computer, handheld device, wireless device, etc.) presents data to a user for work, and the user performs one or more actions on the data. The user may also create data in an application, which data can then be made part of the system or otherwise be interacted with. The user experience with the work environment and/or the data to be worked includes how the data is presented to the user for interaction.

The introduction of enterprise service architecture (ESA) into the enterprise has exposed deficiencies in interactive controls for data. With ESA, business applications resemble more a bundle of resources than a monolithic transaction or application. Thus, the monolithic approach of building a single application to perform operations does not apply well to modern enterprise systems. The advent of ESA also coincides with the fact that applications and functionality are being applied to multi-channel, multi-modal occasionally connected (OCA) user experiences. Current solutions are built on the monolithic approach, and are inadequate at delivering content to a user on various channels and in various form factors. Although users expect pervasive access to business context data, traditional systems do not support the providing of information and tools for multi-channel, multi-modal OCA user experiences. Users have traditionally had to adapt expectations and behavior to deal with limited connectivity, access to data, and limited ability to perform work on tasks.

An attempted solution at providing a different user experience is the user of the MVC architecture to decouple data model (M), interaction control (C), and appearance (V) in generating the user interface. In reality, contrary to what is expected, traditional separation in these layers does not make the layers agnostic to each other. Backend services are built to feed the model of user interface (UI)-patterns, and the controller supports the behavior of the visual layer. Because of these interdependencies, the enabling of UI-patterns requires sophisticated knowledge about available services and programming skills to integrate the layers. The traditional requirements for knowledge and programming skills results in higher development and maintenance costs to generate multi-modal support. Additionally, traditional approaches have still not provided the user experience expected by users. The integration of the M-C-V layers to produce a relatively consistent user experience has remained impractical.

Furthermore, work within an enterprise or company is frequently performed within the framework of a business process or a workflow having a business objective. The workflow traditionally has multiple phases or states, where business activity is required for each state. Traditional workflows are ERP (Enterprise Resource Planning)-centric. That is, workflows as previously established were focused around systems. Traditional methods of attempting to integrate workflow concepts with user experience across multiple platforms has not been effective in providing the consistent experience a user would expect.

SUMMARY

In one implementation, methods and apparatuses in a server enable generating business context data that describes a resource, a view, and actionable context data related to a business scenario. The business context data may be an instance of a meta object having a data structure with data components selected from among multiple backend systems. The meta object can be instantiated from a model that defines how to instantiate the meta object given the data components. The business context data need not specify or be formatted for any particular user interface (UI) capability of a client device. The server transmits the business context data to a client device that has an active client that processes and uses the business context data. From one perspective, the interaction can be understood as a modified MVC architecture, where the model is represented in the generated data, and the view and controller are present in the active client. Thus, the server provides raw business data, which the client device is then responsible for rendering and controlling. In one embodiment, generating the business context data includes binding a data component to a backend system.

In one implementation, methods and apparatuses in a client device enable receiving business context data that describes a resource, a view, and actionable context data related to a business scenario. An active client of the client device identifies user interface capabilities of the client device and generates a user interface (UI) component based on the business scenario and the identified UI capabilities. The UI component enables functionality related to the work task on the client device. In one embodiment, the resource may include a business object, a document, a form, a report, or an identified individual. In one embodiment, the view may include a data layout, an association of a graphic with a function, or a text field to display. In one embodiment, the actionable context data is a work task of a workflow. In one embodiment, the business context data includes a description of the business scenario as metadata associated with the data describing the resource, the view, and the actionable context data. In one embodiment, the active client can interpret a user action in light of the business context data, and generate a request for a contextual action based on the user action and a context of the business context data.

In one implementation, methods and apparatuses in a client device enable predictive deployment of services. An active client identifies actionable context data of a business scenario hosted by a server, where the actionable context data is to be performed on the client device, and the client device is capable of operating in an offline mode disconnected from the server. The active client identifies a disconnect condition that indicates a likelihood that the client device will be disconnected from the server and enter an offline state. The active client automatically identifies a resource and/or a service associated with the actionable context data and automatically accesses the resource and/or service from the server prior to the disconnection, in response to detecting the disconnect condition. The resource and/or service can be stored locally and accessed locally in the offline mode.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
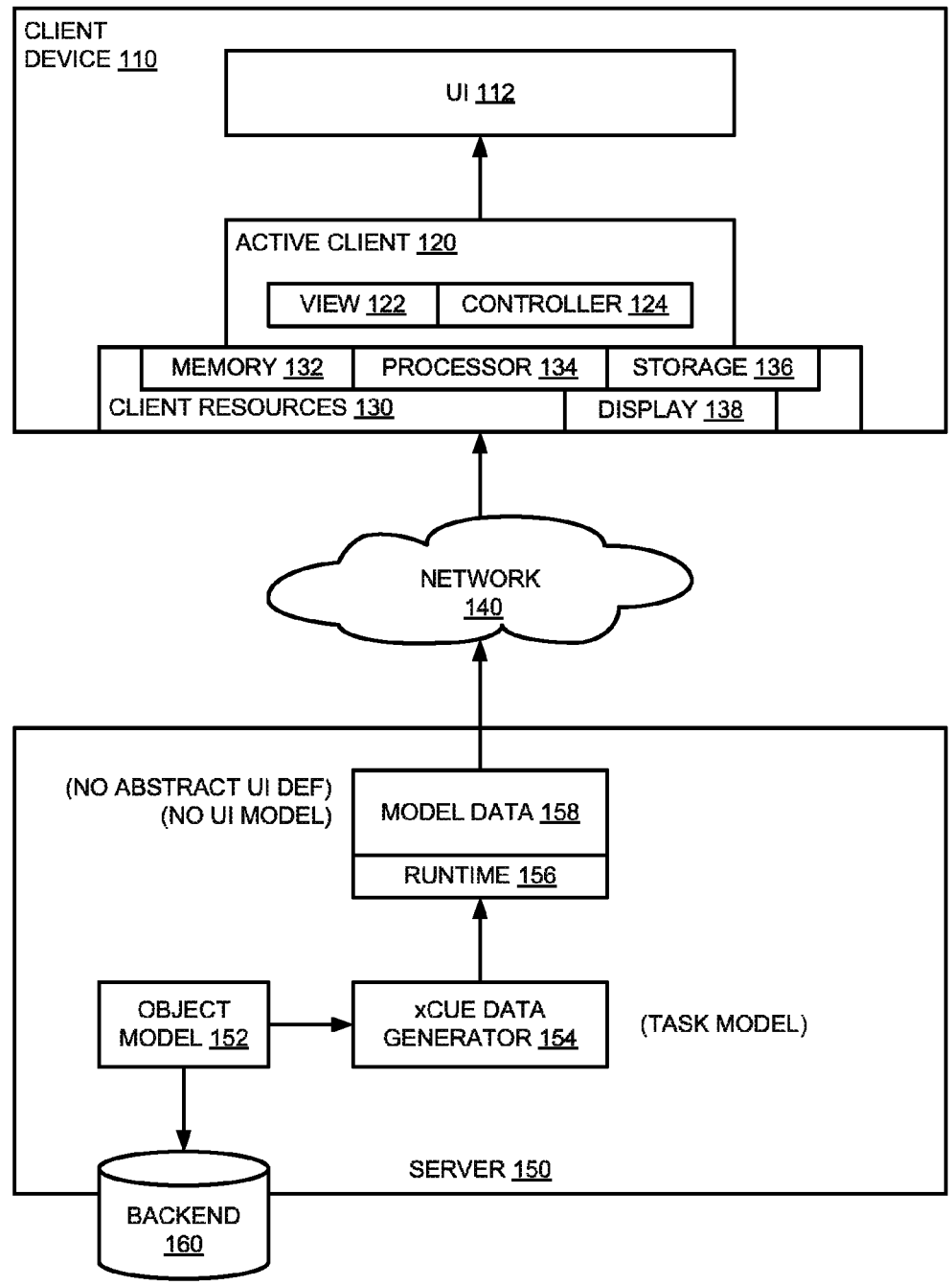
FIG. 1 is a block diagram of an embodiment of a system having a client device and a server that provides model data to the client device.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a business context data model provides raw business context data that can be delivered to an active client for processing. As used herein, business context data refers to data that describes elements of data related to a business context or a business scenario. Business context data as described in more detail below is generated as a meta description with components aggregated from one or more backend systems. A modified application of an MVC-like model provides the business context data in a raw format, where the active client processes the data and is responsible for generating the user experience based on the resources of the user access device (e.g., desktop, laptop, handheld, etc.). The business context data includes actionable context data, which provides an environment for a user to perform work. As used herein, actionable context data refers to data or data objects on which a user can operate, or with which a user can interact to perform one or more business operations. Actionable context data may be referred to also as a "business task" or simply as "work," Actionable context data may or may not be associated with a workflow or a workflow task. That is, actionable context data enables a user to accomplish some action with respect to a business purpose, which may or may not include an action that is part of a workflow or business process. The model and the active client can be applied to a modified approach to workflow modeling and processing. Thus, users who have work to perform on a business activity can more easily and rapidly access and perform work scenarios and activities among a variety of devices suitable to the current situation in which they happen to be.

One example of how business context data can be generated in reference to workflows is via the concept of a Distributed Activity Management. An enterprise system can model a business process for a workflow on multiple layers. Such a model is described in more detail in U.S. patent application Ser. No. 11/803,760, entitled, "Distributed Activity Management," and filed May 15, 2007. Note that the Distributed Activity Management is simply one example of how business context data may be generated, and an overview follows for the sake of illustration. However, other models or systems may be employed to generate business context data. Briefly, in one embodiment, a business process is modeled on three layers in the Distributed Activity Management system: Scenario, Activity (task), and Action. A scenario layer exists on a first level, where a developer lays out the activities of users, and connects activities of one or several users through an event-driven control flow, such as RTP relationships. Thus, in one embodiment, every activity has a requester and a performer. Requests can be simply accepted and acted on, or the performer can ask for additional details or enter negotiations with the requester. The scenario description may include a role description for the performer of an activity that profiles the performer with respect to skills, organizational rote, relationships to other performers, or simply the name of the user. The role definition facilitates the scenario and a resulting business process to be dynamic. Rather than inputting a particular person into the business process, the business process can be defined in terms of a role, or a "type" of person that can/should perform a particular action. When the business process is instantiated, the system can place an actual person into the workflow.

Scenarios are composed by defining activity blocks, assigning them to process roles, and linking them through requests. Each activity is triggered by a request, which may be either a system event or human request. Resources from the scenario context are handed over to activities as required resources. As used herein, resources refer to elements that may be used to perform a work action. Examples may include a business object (a vendor, an invoice), a document (a statement of work (SOW)), an interactive form (ISO certification questionnaire), people, a report, etc. Ad-hoc conversations between requester and performer are supported and optionally captured as a conversation thread.

An Activity Model within a scenario is modeled as a separate entity describing an actionable business context interfacing with the scenario via events. A request event triggers an activity that models personal contributions in the form of a context description that defines potential actions, resources, rules, and related information associated with the activity. The activity may also include requests to other contributors to perform certain activities. An activity can further be split into separate actions that accomplish a task. As used herein, a task refers to a phase of a workflow. A task is some work or action (which could be an Action as described below), or something to do or accomplish. Tasks may be the subject of requests. An activity block is a collection of actions, information, and related resources that one user needs to accomplish the requested task. Each activity Hock may provide guidance for individual performers in terms of what actions to perform, and the checking of preconditions, required resources, and business rules. Each activity can be enriched to offer related information and actions. The system can also model activities recursively, so that a request within one activity can trigger sub-activities or entire new work situations (scenarios).

An Action is a reusable atomic building block for meaningful business acts. An action provides a high-level enterprise service that encapsulates services and a user interface (UI). In one embodiment, actions provide a plug-and-execute interface to the activity context. In one embodiment, an action is a non-transactional view of a work item. Actions can provide the UI for supporting user interaction. Actions as reusable building blocks can be used to construct complex activities of a distributed workflow. Actions are connected to the enterprise backend (ESA), and may contain embedded navigation (e.g., object links, multiple screens such as guided activities). Examples of actions might be: Post Message, Create PO, Approve Vendor, View Supplier Details, View 360 supplier review, Create Vendor Record, Request Missing Document, Choose Between Candidates, Evaluate Candidate, Submit Application, Set New Salary, Promote Employee, Create Invoice, etc., or anything that can be perceived as an atomic work action from a business perspective. Thus, actions will likely be different in different implementations, seeing that different enterprises/organizations may view the atomic level of actions differently.

The modeling of a business process on multiple different layers enables the use of building block components to model and generate workflows. The model of the business process with the different layers can provide a data model for providing information to a user on various channels in various modes. The use of the building block model can make services and functions available to a variety of devices. The scenarios and activities enabled by the distributed activity model provide a business context and data to enable a user to access and perform work. The scenarios and activities can be understood as a Business Experience Schema (BES) that is interpreted by an active business client (described in more detail below). In one embodiment, the active business client provides progressive access to data depending on context and device capabilities.

In one embodiment, activities and actions are annotated, and together with personal preferences, the annotations allow for smart dispatching, previewing, and execution of activities in multiple devices. Activities can be annotated with respect to task complexity on a scale from problem solving to simple approval. Actions can be annotated with respect to UI requirements (e.g., needs large display, can be performed via voice), and with respect to availability of service (e.g., real-time, offline, OCA).

In one embodiment, the distributed activity management model and the active client approach can provide predictive deployment of services and functions to offline clients based on activity models. Such implementations allow a user to work offline and automatically upload at reconnection. Activities encapsulate a coherent set of business content and functions necessary to accomplish specific work intent. This data model can be used to deploy all necessary services and resources to a mobile enabling the user to look at data and perform actions in an offline mode.

A runtime in a server that provides the model data can create a non-technical, business-only configuration layer on top of the enterprise services architecture and repository (ESA and ESR) of an enterprise. The active client receives the model data on any of a number of different channels to consume a basic metadata schema of the data. Through the active client, a user can navigate to and within activities.

As mentioned above, the above provides an example of a model that can be used to generate business context data. More generally, business context data as described herein can be generated by any system capable of accessing and creating a meta object from any one or more backend sources of data.

The data is accessible to the user in a single context and can be operated on from a single point of access. The active client can directly operate on such entities such as a request, an activity, and an action, referring to the entities described above, as well as any actionable context data or meta object. The active client can also interpret these entities at runtime and generate a channel-specific UI to navigate, scan, check, and preview such work contexts. In one embodiment, the active client is referred to as an Active Business Client because it has an understanding of business context (the underlying scenario) and is able to actively facilitate managing requests, and to progressively disclose more functionality depending on channel and work situation of the user.

From one perspective, in one embodiment, the active business client consumes data streams, similar to an RSS (Really Simple Syndication)-client consuming RSS-data streams. An RSS client essentially provides an opt-in, always-on connection to a data stream source, which does not require the user to reload or refresh the site to obtain new content. However, the application of RSS is limited to news sites, blogs, or similar web pages, where a main page is relatively frequently updated with new content. The active business client as described herein can "consume" a "data feed" of a stream of workflow or activity data. As the context behind the context data is updated or the underlying components are changed in the backend, the active client can access them for update on the device through which the user will perform work. Thus, data associated with business tasks, assignments, or workflow actions can be automatically updated. In contrast to an RSS connection to an open web site where new content is frequently posted, the active business client connects to a backend layer (which is generally secure). The data "consumed" from the backend is data related to work to perform, and may include business objects and services that allow a user to perform work. The consumed data is related to an activity or task assigned to a user. The user need not even request the connection or opt in to obtain the data; rather, it is received by virtue of the assigned business task. Active business clients can be developed for various different types. For example, the clients can be customized for different client device types.

The active client can provide access to the resources that enables the performance of interactive or actionable work related to a business scenario. Such capability provides at least the advantage of providing content and the ability to work from multiple devices and locations. Such ability to work from multiple devices and locations can better meet future expectations of users who are foreseen to expect access to content and the ability to manage work on various devices and from many locations. The fact that applications and business functionality will not be localized to a single computer and a single desktop will not inhibit the user from performing work. The user business experience can become pervasive and event driven.

From one perspective, an implementation of an active client consuming business context data can be viewed as a modified MVC-like architecture. Traditional implementations of an MVC architecture are limited in that the data model (M), interaction control (C), and view (V) layers are not agnostic to each other, and require the use of sophisticated knowledge about available services, and programming skills to integrate the system together. Current MVC implementations have limited value for a multi-channel user experience architecture, at least because the data is processed at the server for abstract UI definitions, which are converted to different channels after the entire MVC stack has been processed. Such MVC implementations do not have the flexibility necessary to create different native user experiences for different channels, which may be significantly different (e.g., compare a smart phone, a desktop widget, and a voice interface within a car). Instead of tweaking abstract UI definitions into different channel-dependent user interfaces as previously done, the business context data and active client approach described herein can send raw business context data to the client device, which is then fully responsible for creating the user experience.

The data model as described above enables the generation of data that can be consumed and processed for a variety of different client devices, at the client devices. The output of the data model (the "M" aspect) is a business or work domain language rather than a UI domain language. An example implementation may be referred to as an xCUE (cross-channel user experience) system. The model output describes resources, views, and work for a given business context. The active client at the front end of the client device consumes such data feeds and maximizes the user experience for the client device. The data output or data feed is not limited to a single client interface, and thus, the user experience is not limited on one device due to cross-channel limitations.

Activity-centric applications such as mobile applications, desktop widgets, or transient tasks opened from message inboxes can be built based on a selected set of compound UI building blocks. Contrast such an activity-centric approach from the traditional business application, where the UI pattern is part of the larger application. Instead of the performing of work out of a traditional business application, users can be enabled to access information and inspect detailed information about an item of interest from any of a number of interfaces. Such a user activity can be modeled as one compound UI building Hock, which handles all user interaction in itself.

FIG. 1 is a block diagram of an embodiment of a system having a client device and a server that provides model data to the client device. System 100 includes client device 110 and server 150. Client device 110 represents any type of computing device, whether laptop, handheld, or desktop. Server 150 is typically an enterprise server, but may be any other type of server that acts as a data source for business context data.

Client device 110 includes UI 112, which represents any type of user interface hardware display components (such as an LCD (liquid crystal display), touchscreen, Braille interface, etc.) with associated drivers, as well as interface components that provide input to client device 110 and interact with items displayed on UI 112. Thus, UI 112 can be considered a user interface system with input and output capabilities. Note that UI 112 will have certain capabilities that will change from device to device. For example, the screen on a handheld device is generally smaller in form factor than that of a laptop.

Client device 110 includes various client resources 130, which may include, for example, memory 132, processor 134, storage 136, and display 138. Resources 130 provide resources with which to process data and perform work. Memory 132 represents any type of memory that provides temporary storage of data and instructions. Memory 132 may include any type of random access memory (RAM), as well as read-only memory (ROM), or Flash. Thus, memory 132 may be a volatile or non-volatile memory device (i.e., it may or may not lose state when power is interrupted to the memory device). Processor 134 represents one or more processors, which may be discrete devices, multi-core processors, central processing units (CPUs), microprocessors, microcontrollers, etc. Storage 136 provides non-volatile storage of data and instructions. In certain handheld devices, memory 132 and storage 136 may be the same device, or partitions of the same device. Display 138 specifically represents resources associated with the display capabilities of UI 112. In one embodiment, display 138 also represents stored information about what resources are available, and may even indicate how data can be displayed or interacted on client device 110.

Client device 110 includes active client 120, which is an example of an active client according to any embodiment described herein. Active client 120 represents one or more components that receive and process business context data. In one embodiment, active client 120 can be considered to include view 122, and controller 124, referring to the "V" and "C" layers of a modified MVC implementation. Controller 124 receives and processes user input and performs one or more actions, operations, or tasks based on the user input. Thus, controller 124 provides mechanisms through which changes may be invoked on the data that is the subject of the "M" layer. View 122 renders the data for display and interaction in UI 112. The data itself is discussed in more detail below, but briefly is provided as model data 158 from server 150.

Network 140 represents one or more components that interconnect client device 110 and server 150. Note that client device 110 is not necessarily always connected to network 140. However, when data is passed to client device 110, or when client device 110 is consuming data, it is via network 140. Network 140 may include network interface cards or components in the separate devices (client device 110 and server 150). The network interfaces interface to wired Ethernet or wireless (e.g., 802.11) networks. Network 140 may include one or more local area networks (LANs and/or WLANs (wireless LANs), as well as wide-area networks (e.g., the Internet). Note that as a mobile device, client device 110 may access, for example, a WLAN, which in turn accesses a wired network connection, which may access the Internet through a service provider, which in turn connects to a network via which server 150 can be accessed. Alternatively, the network could be much simpler. Thus, network 140 is to be understood as an abstract representation of the connections through which client device 110 and server 150 communicate.

Server 150 includes object model 152, which represents a framework of components from which specific objects may be generated. Object model 152 includes interfaces and access and execution methods for data objects. In one embodiment, object model 152 is used to generate objects that are stored in backend 160. Backend 160 can be a specific enterprise system ERP (enterprise resource planning), CRM (customer relation management), etc.), or a repository of data objects not tied to a specific system.

One or more data objects for a business scenario can be generated with data model 152, xCUE generator 154 represents one or more components that generate such data objects. When discussing xCUE, generator 154, generating the data objects can generally be understood to refer to instantiating a data object with specific data and/or parameters. Typically, the data generated is data that either represents resources or is related to resources of the business scenario. That is, a business scenario may have activities, data, files, forms, etc., associated with performing a unit of work or accomplishing a task, which may or may not be associated with a workflow. There may also be specific people involved (e.g., a supervisor for confirmation or approval), xCUE generator 154 generates data related to such resources for the business scenario. In one embodiment, xCUE generator 154 provides are executes the task model as discussed above with respect to the activities, etc., for the distributed activity management. In such an implementation, the workflow components are generated as individual building blocks of the workflow that are aggregated to provide the resources and functions necessary to execute a business task.

Server 150 includes runtime 156, which represents components (e.g., software modules) and an environment (e.g., an operating platform and/or application, and/or APIs) to prepare and send the model data to one or more clients. In one embodiment, model data 158 represents the data as generated by xCUE generator 154, and enriched with data schema metadata. The data schema metadata provides additional details regarding the business scenario, and may include mapping and relational information between data objects and/or resources. Data model 158 represents the "M" component or layer of the modified MVC implementation. The model provides domain-specific representations of the data. The domain logic that is part of the data provides meaning to the raw data or parameters used to instantiate the object.

Note distinctions in the MVC-like architecture illustrated compared with previous implementations of MIX architectures. Previous implementations of MVC architectures included the controller layer ("C") at the server, where data was translated to a specific format for a particular user interface. Thus, the server had to support and have separate control for each channel to which data would be provided. In contrast, the controller component is part of active client 120 of client device 110. The server can simply generate data and send it to the client device for processing. Thus, model data 158 does not include abstract definitions. Additionally, there is no need for UI model or UI pattern information to be included in model data 158. The data itself with the business context information provides what is necessary to render the data in the client device and enable a user to perform work on the data.

Figure 2:
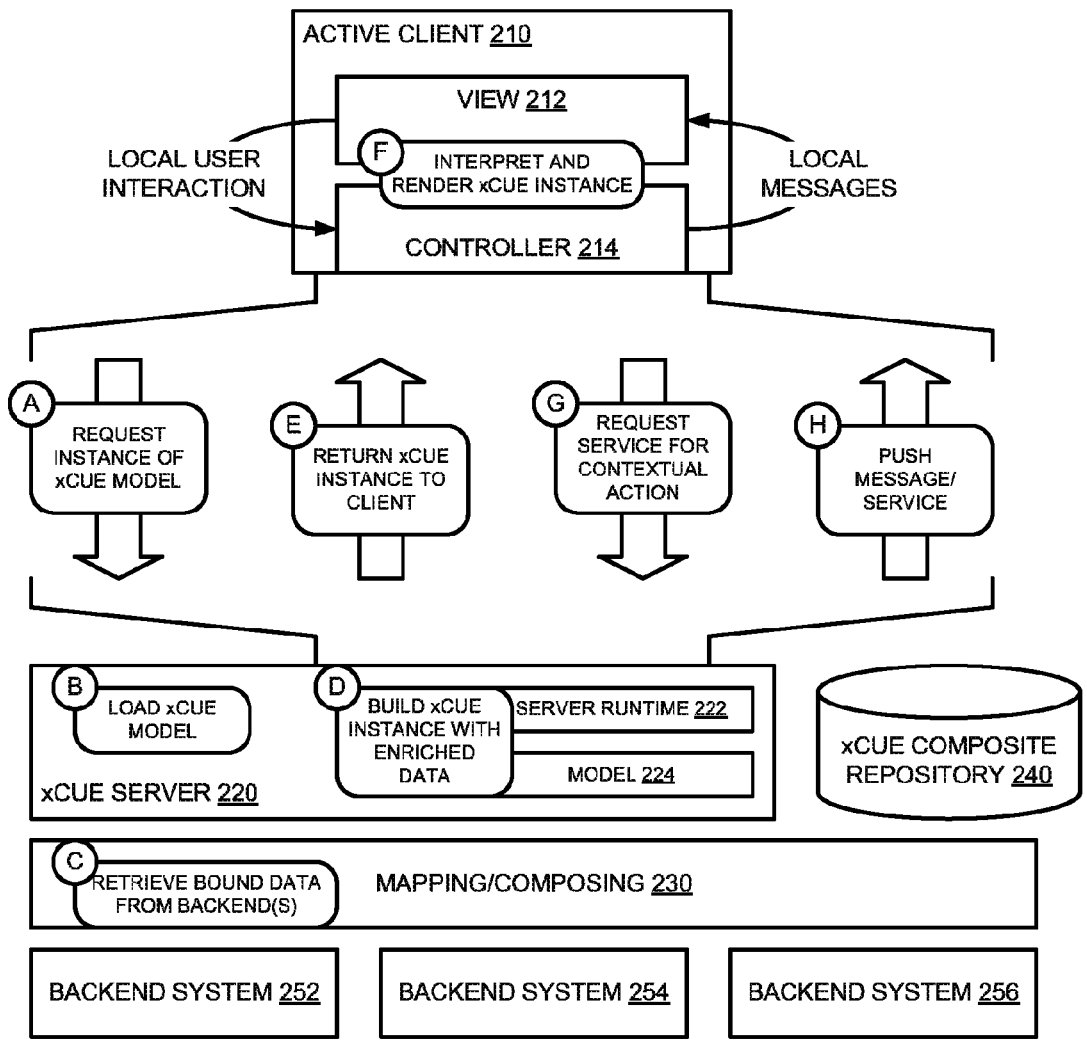
FIG. 2 is a block diagram of an embodiment of a system illustrating interactions between an active client and a server that provides enriched model data.

FIG. 2 is a block diagram of an embodiment of a system illustrating interactions between an active client and a server that provides enriched model data. System 200 represents an example of a client-server system according to any embodiment described herein, including that of system 100 of FIG. 1. System 200 includes active client 210, which is hosted on a client device (not shown). The client device can be any type of client device that a user can employ to access a network. Through the active client and business context data as described herein, client devices can be enabled to provide access to resources for performing work, even devices that were previously not considered capable of such operation. Active client 210 consumes data that includes business context and resources for actionable context data.

Active client 210 includes view 212, which represents a view as described above, and controller 214, which represents a controller as described above. Briefly reviewing, the view renders data into a form that can be displayed on a UI and interacted with via the UI by a user. The controller receives and processes the user input and provides updates to view 212. Controller 214 also coordinates access to a backend to cause changes to data, to make requests, to access updated data or additional data, etc. Thus, as illustrated, view 212 provides local user interaction to controller 214, which can then provide local messages back to view 212. In between receiving the local user interaction and providing the local messages, controller 214 can perform processing, access the backend, and/or queue changes in an offline mode for synchronization when the host client device is brought back online. In one embodiment, controller 214 enables active client 210 to determine whether or not to deploy an action or operation (described in more detail below). That is, the processing, by controller 214 can indicate that the client device is not a good device on which to execute a particular action.

Based on such a determination, the active client may not access one or more services, resources, or data elements from the backend. The access of services or data may thus be selective based on whether an action will be made available. Thus, the particular action may not be enabled on the client device (although it might be viewable).

System 200 includes xCUE server 220, which represents an example of a server that generates and provides business context data streams. Such business context data streams may be referred to as xCUE data streams. Server 220 includes server runtime 222 and model 224. Server runtime 222 includes all components necessary to access the backend and generate business context data. Server runtime 222 provides a runtime in which to instantiate the business context data. The business context data is generated from model 224, which includes frameworks, standards, methods, interfaces (e.g., APIs, function calls, etc.), etc., to generate data. The model includes models for workflow building block components.

Mapping/composing 230 represents a logical layer in a backend system that can interface between the "xCUE server" and other backend server systems. For example, backend systems 252-256 may each represent different backends from which data is available. Composing and constructing the actionable context data from components is not limited to accessing components from a single backend. Thus, the actionable context data can be composite or mashup data components or meta objects that provide data from multiple distinct systems. The systems need not necessarily be "compatible" or provide data that has the same methods or attributes. Mapping/composing 230 translates and provides the data into the model.

In one embodiment, the resulting generated meta components that are formed by multiple distinct components of different systems can be stored as model entities for later reuse. xCUE composite repository 240 can store such composite or meta components. Alternatively, xCUE composite repository 240 can store individual components and a mapping or relationship data to compose the data.

System 200 is annotated with a possible implementation flow of how the various components interact. Note that other implementations are possible. In one embodiment, a user interaction includes a user attempting to access work that is assigned to the user. The access can be via opening an attachment of an email, opening an item on a work center or worklist, or the user can create work. At action A, controller 214 generates and sends a request for an instance of an xCUE model. At action B, xCUE server 220 toads the xCUE model (an example of model 224, which may also include other data models). In one embodiment, via mapping/composing layer 230, xCUE server 220 retrieves bound data from one or more of backends 252-256. Some data accessed is bound to one or more services or functions of one or more particular backend systems. The bound data is already bound to the necessary system, which enables the data component to be incorporated into a meta component, and still have the necessary interfaces for providing data or services expected from the bound data.

Once the individual data elements are gathered, xCUE server 220, via server runtime 222 and model 224, builds xCUE instance with the enriched data at D. In one embodiment, the enriched data is data that includes business scenario metadata. The server at E returns the xCUE instance to the client device. The instance is received at controller 214 and processed. One or more local messages can cause the data to be rendered on a user interface.

In one embodiment, based on the xCUE instance, a user requests a specific action. For example, a particular actionable context data component may include a workflow task.

The workflow task may include the creation of a purchase order (PO) for a specific product of a specific system. The user may simply need to request creation of a PO, and based on the business context of the xCUE instance, active client 210 understands a context behind the request for the PO. Thus, the request for the PO is not simply a PO request, but the specific PO that the user wants to create. Thus, at active client 210 via controller 214 can generate a request for a service for a contextual action, which is an action based on the context of the data.

xCUE server 220 receives the service request and can access the service. The request may be associated with a bound interface of a data element of the business context data sent to the client. The server accesses the service and provides the result to active client 210. Such an action is illustrated at H, where the server pushes a message or a service to the client. The message or service can be processed by controller 214 and presented to the user via view 212.

Figure 3:
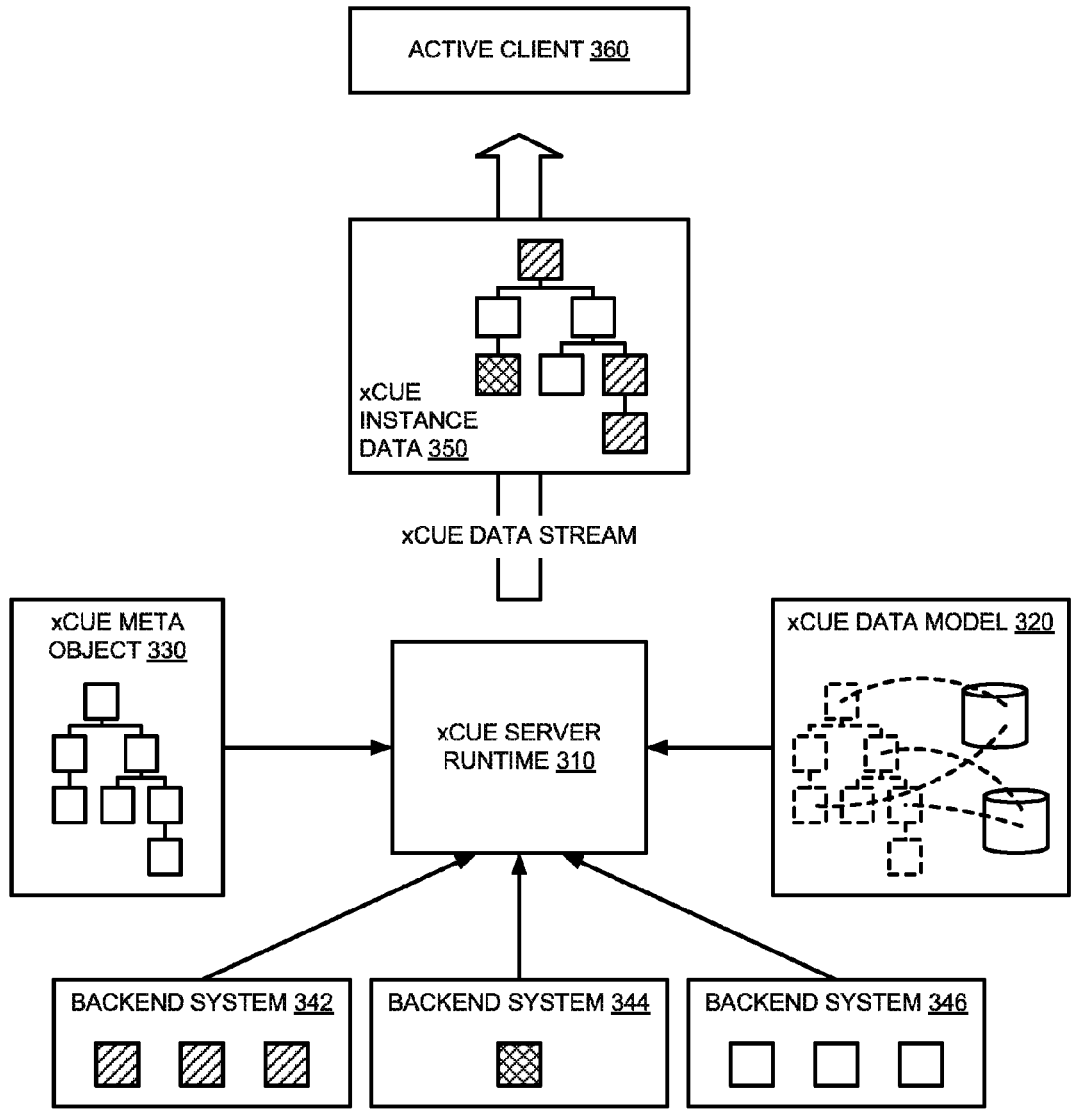
FIG. 3 is a block diagram of an embodiment of a system where a server provides a contextual data stream to an active client.

FIG. 3 is a block diagram of an embodiment of a system where a server provides a contextual data stream to an active client. System 300 represents an example of an active client and server system, where details of the server are provided. The example system can be a client-server system according to any embodiment discussed herein. System 300 includes xCUE server runtime 310. Runtime 310 operates on xCUE data model 320 to generate xCUE meta object 330. Runtime includes components and logic for accessing backend systems 342-346 and incorporating the data elements or components into a meta object according to the model.

As illustrated, in one embodiment, meta object 330 is generated by accessing various different components of various different backend systems. In one embodiment, accessing the various different data components, and/or incorporating the data components into a meta object instance includes binding the data component to the respective backend system from which it is derived. Thus, the interfaces and services related to the data components will become part of the meta object. Data model 320 includes mapping rules between the backend data, which is exposed through services, and meta object 330. The mappings can indicate what data elements from what systems are to be used for which structural elements of a meta object. Meta object 330 provides a data structure that describes the data schema needed to enable certain usage scenarios on an active client. Note that meta object 330 may not need to include any UI information. In one embodiment, no UI information, or minimal UI information is provided in meta object 330. The mappings of concrete elements (as illustrated in backends 342-346) to the various defined structure components of meta object 330 provides an meta object instance in runtime 310.

In one embodiment, the meta object instance can be provided similar to a data stream to active client 360. xCUE data stream represents such a stream that provides xCUE instance data 350. Note from the shading of the component parts of instance data 350 that different data elements from the different backend systems have been incorporated together into a meta object instance. The mapping of the different elements is based on the business scenario, and may be based on the type of client to which the data will be sent. In one embodiment, instance data 350 includes business data, task semantics, contextual information and actions. The composed instance data of the meta object is interpreted by active client 360 and presented into a UI associated with the host client device.

Active client 360 receives and enables a user to access and operate on instance data 350. Note that as a data stream, there may be an active link between active client 360 and the server. If elements of instance data 360 are changed, the changes may be pushed to active client 360 to dynamically update instance data 350. Changes requested at active client 360 (e.g., via the user are executed to the various backends, based on the mappings and any bindings that may exist on the data elements.

Figure 4:
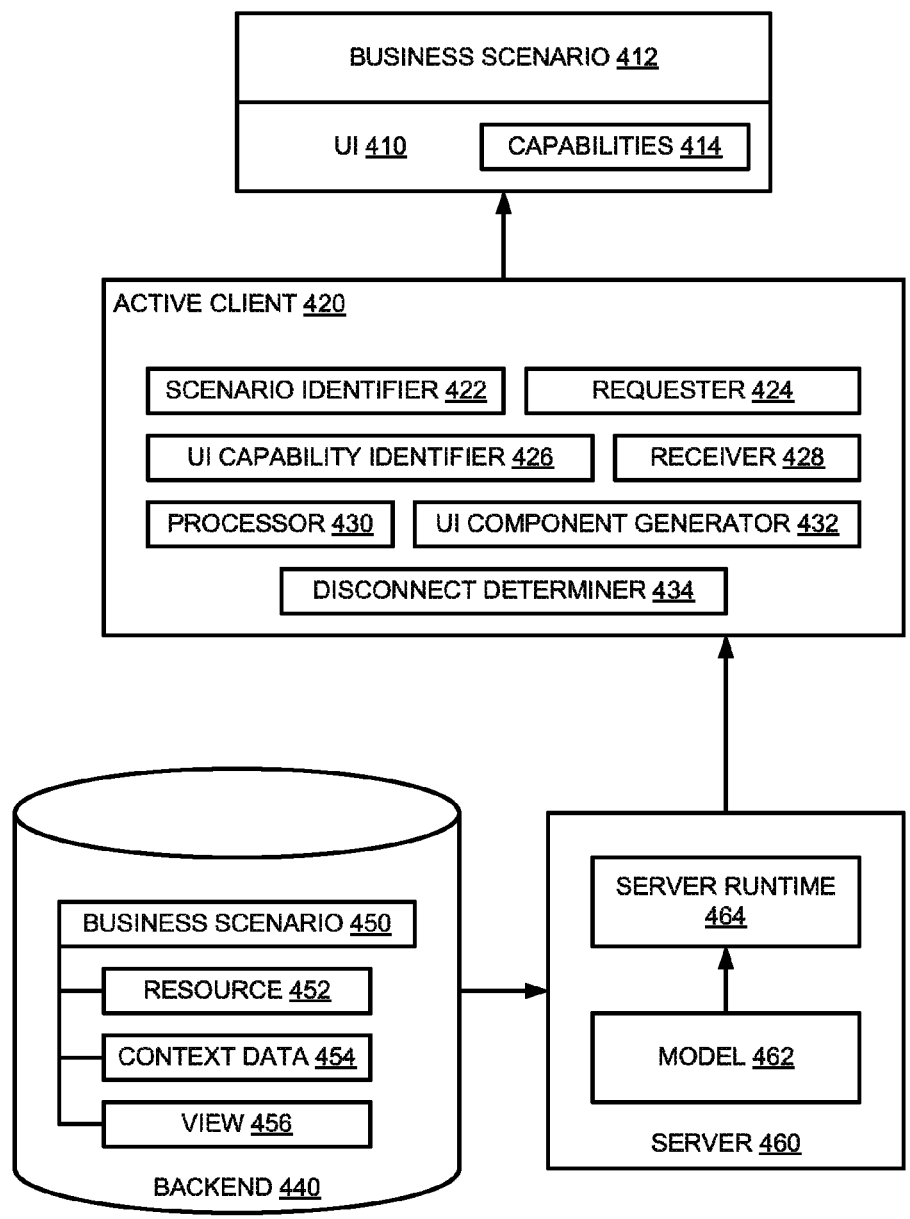
FIG. 4 is a block diagram of an embodiment of a system having a server that provides business context data related to a business scenario to an active client.

FIG. 4 is a block diagram of an embodiment of a system having a server that provides business context data related to a business scenario to an active client. System 400 represents a client-server system according to any embodiment described herein, where an active client receives business context data from a server. System 400 includes UI 410, which may be a graphical user interface (GUI) at the client side. UI 410 includes multiple capabilities 414, which represents interface types (e.g., touchscreen, LCD display), interface resources (e.g., amount of memory, screen size), version type, interfaces (e.g., formatting, protocols), etc. Capabilities 414 represent anything, including information, which may affect how user interface components can be rendered/displayed on the device.

The client device also includes information related to business scenario 412. Business scenario 412 includes information that indicates a type of operation being performed, a task being executed, etc. In one embodiment, such business scenario information is provided to the client as metadata in the business context data. The actions and processing performed on the client device will be performed under the business scenario.

The client device includes active client 420, which represents an example of an active client according to any discussed herein. Active client 420 may be illustrated as various functional elements that may be provided by the active client. Note that not all functional elements shown are necessarily part of every implementation. Additionally, active client 420 could be implemented with other functional elements, including similar or substitute functions to those illustrated. The functional elements may be provided as modules or engines, whether hardware, software, or a combination. Possible functional elements may include scenario identifier 422, requester 424, capability identifier 426, receiver 428, processor 430, UI component generator 432, and disconnect determiner 434. Each functional element will be discussed briefly in turn.

Scenario identifier 422 enables active client 420 to identify the business scenario to which an activity and resources are related. In one embodiment, scenario identifier 422 includes a metadata reader to access and process metadata associated with business context data to identify a business scenario. In one embodiment, scenario identifier 422 reads metadata associated with an operating context that identifies the business scenario. Based on the identified scenario, active client 420 can generate contextual requests and produce contextual actions.

Requester 424 enables active client 420 to generate requests for instances of meta objects. Requester 424 can generate and send a message to the data source server for an instance of a meta object related to a business scenario (e.g., data related to a workflow task) to be performed on the client device. In one embodiment, the request can identify the business scenario to the server to enable the server to determine what resources are associated with the business scenario, and to generate an appropriate meta object.

UI capability identifier 426 enables active client 420 to identify what capabilities are associated with the particular client UI. The UI capabilities are described above with respect to capabilities 414. Such capabilities can be identified via querying the UI, or via access to stored information about the device. In some implementations, both querying the UI and accessing stored information will be used. Determining the UI capabilities can inform the view layer of the MVC architecture.

Receiver 428 enables active client 420 to receive messages from the server, including message that have business context data. The receiver can include hardware and software components of a network connection, or any other communication mechanism employed between the client and server devices. Receiver 428 receives raw data content, not containing UI pattern or other UI-specific information.

Processor 430 enables active client 420 to process raw data content received by receiver 428. The business context data will be processed to determine, among other things, a business context and what components are associated with the business context data. Processor 430 represents the ability of active client 420 to handle raw business context data. The data needs to be processed to determine how to render it, determine what capabilities are needed to display certain information, and determine how the user can interact with the data. Such information informs both the view layer and the controller layer of the client device.

UI component generator 432 enables active client 420 to generate UI components (e.g., GUI elements with proper interfaces) that render a representation of the meta object data and enable its interfaces on the client device. Not all interfaces are necessarily available on every device (which may be determined by processor 430). Those that are available are converted from raw data form to interactive content on the client device.

In one embodiment, active client 420 includes disconnect determiner 434, which enables active client 420 to determine a disconnect condition exists. A disconnect condition can be identified via metadata associated with a user's operation (e.g., a network connection session will expire in x minutes), or with information known within the system (e.g., the user's calendar indicates that travel is planned for the next three days). In general, a disconnect condition exists when a client device will be disconnected or offline from a server that provides business context data. Disconnect determiner 434 may be able to not only determine that a disconnect condition exists, but to identify the occurrence of the condition, or identify that a condition is impending. Based on such a determination and/or identification, active client 420 may access resources and store data and services or functions locally that will be needed to perform a business task. Thus, rather than operating in a "live" or data stream/data feed mode as described above, active client can actively deploy functions and data necessary to perform work related to a business context. Thus, a user could have all elements accessed and stored locally that will enable the work to be performed on the client device in an offline mode.

Server 460 is coupled to active client 420 and generates and provides business context data to active client 420. Server 460 includes model 462 and server runtime 464. The model and runtime are similar to components that are described above with reference to descriptions of servers with respect to other figures. A detailed discussion of these components will not be provided here. Briefly, the model provides a framework and a mapping of data elements onto a meta object to create a meta object instance. The meta object instance provides a description of one or more resources, one or more views, and actionable context data or a business task related to a business scenario. Generally, a meta object instance represents a single business task, although an implementation could be provided where multiple business tasks are enabled by a single meta object instance. The server runtime instantiates the meta object instance and allows for the object instance to be passed to active client 420.

Backend 440 is coupled to server 460. Backend 440 represents one or more systems, which may include servers, databases, repositories, data objects, data elements (which may be data objects or specific services or functions), etc. In one embodiment, backend 440 includes a mapping or association of resource 452, context data 454, and view 456 with business scenario 450. Business scenario 450 could be a source of business scenario 412, or business scenario 450 may represent a key in a lookup table to determine what resource(s), business task(s), and view(s) are associated with the business scenario. As referred to herein, a business scenario provides a context and an end purpose for a business task. That is, a business task may not exist alone, but rather be part of a larger purpose of what is to be accomplished via the task. The business task may be one of multiple tasks that accomplish an end-goal of business. The end-goal can be anything that a business does, such as processing an order, generating a purchase, producing a product, etc. A resource (e.g., resource 452) may refer to a function, a service, a document, a file, a data object, or anything that may be used to perform a business task. A resource may also represent a person or a particular role (e.g., manager). The business task (e.g., task 454) may refer to an operation or unit of work that is performed to accomplish the business purpose. The task may be simple, such as approving an order, or more complex, such as generating a proposal. The task may be part of a workflow, but is not necessarily part of a workflow. A view may refer to an indication of what data is to be displayed, a data layout, what objects and/or graphics are associated with what functionality, what a starting view of the data is, what areas are expandable or can be further reviewed, what text fields to show, what graphics to display, etc. Generally, a view represents how the data can or should be presented on a UI to the user.

When business context data is generated by server 460, the business context data defines a resource, a business task, and a view. Note that multiple views, multiple resources, multiple tasks may be possible. When the business context data is passed to active client 420, the active client is able to process the business context data to extract such information and render the data for presentation in the UI.

Various components referred to herein as modules, clients, engines, or agents described herein may be a means for performing the functions described. Each component described herein includes software or hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 5:
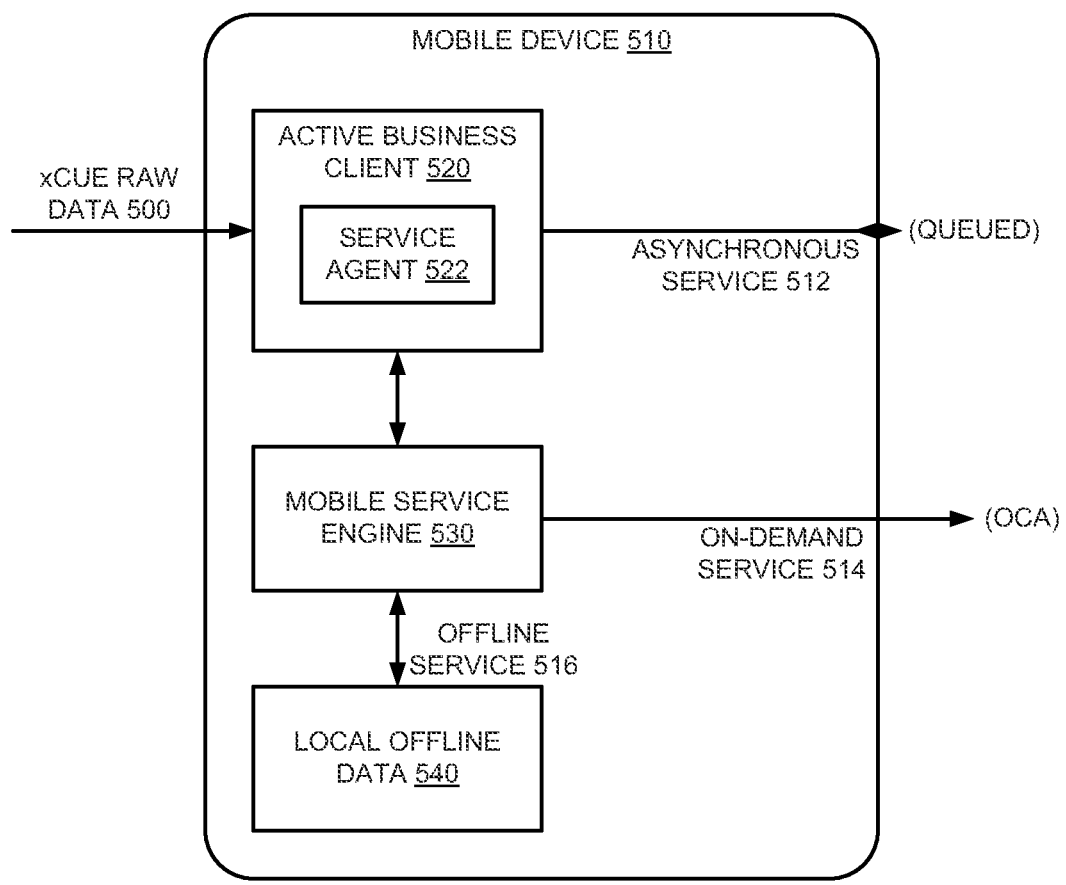
FIG. 5 is a block diagram of an embodiment of a mobile client device with an active business client.

FIG. 5 is a block diagram of an embodiment of a mobile client device with an active business client. Mobile device 510 represents any type of handheld device, including smart phones, electronic organizers or personal digital assistants (PDAs), laptops, or other devices that may be physically removed from an office and operated in another geographic location. Mobile device 510 represents a client device that connects to a server to obtain data and functions related to performing a business task (e.g., from a workflow, or a phase of a workflow, etc.).

The input data to mobile device 510 is business context data, which is represented by xCUE raw data 500. xCUE raw data 500 represents data that includes information and functions necessary for mobile device 510 to allow a user to operate on the business task, but does not have specific UI definitions or UI-specific implementation details. The data is raw because the processing needed to render the data is not provided at the server in generating the data, but is provided at the client side via the active client that receives the business context data.

Mobile device 510 includes active business client 520, which provides an example of an active client according to any embodiment discussed herein. Active business client 520 receives and processes raw business context data 500 and presents the data to a user. Raw data 500 provides business context data for an activity or a business task. The activity can be understood in one embodiment as functionality that is to be deployed to the mobile device. An event trigger can cause the functionality to be deployed to the mobile device. Event triggers include system events, user actions or requests, etc.

An example may be that a user of mobile device 510 is requested to create a statement of work or master service agreement for a particular vendor, or create a vendor record. The initial request can be provided to mobile device 510 as a message indicating the user is requested to do something. The user could then check to see on mobile device 510 if all information is provided, for example, whether all vendor information has been provided. In one embodiment, only actions that can be executed on a client device are deployed to the client device. For example, sending an action to mobile device 510 for a user to check might not make sense if the user then cannot execute the action on mobile device 510. Thus, in one embodiment, the server determines whether to make the action available on the mobile device (or determines whether to deploy the action). Thus, in one embodiment, all business clients on any form factor may be enabled, and can receive business context data. The user can then review request, review an activity, and see what action should be taken. However, if the action cannot be executed on the client device, the action may not be available. In one embodiment, actions are annotated with messages, such as "perform only in online mode," etc. Thus, the system can determine whether actions should be deployed and available to a user. The annotations can be provided by the system (e.g., the server), for example, based on metadata related to the actions or business tasks, or a lookup table to indicate requirements for particular actions. Such annotations can be added to the business context data and sent to the client device.

Mobile device 510 may handle a variety of different tasks and data. There may be a general pattern for handling particular tasks. As illustrated, asynchronous service 512 may be queued. An asynchronous service is one where active business client 520 may make a request, and then return to performing other operations without waiting for a reply. The asynchronous service may be queued until a connected server is ready to receive and process the request. The asynchronous service may be queued while the mobile device does not have connectivity, and synchronizes when a connection is available. In one implementation, a connection may be available, but messages are only sent during a synchronization time. Asynchronous service 512 can be exchanged during the synchronization.

Mobile device 510 may include mobile service engine 530, which represents one or more components that allow for on-demand services. Examples of on-demand services may include viewing a report, opening an object, posting a message, entering a form, creating a PO, etc. Mobile service engine 530 provides mechanisms for receiving and executing service components. More particularly, the components may be remotely managed. In one embodiment, mobile service engine 530 is an implementation of a framework compatible with OSGi (Open Services Gateway initiative) Alliance framework. Briefly, OSGi provides specifications for a framework that defines a service registry and a life cycle model for applications. The framework enables a number of different OSGi layers, APIs, and services that are compliant with the model. The framework provides a component model, where applications or components can be remotely managed, including installing, starting, stopping, updating, and uninstalling the components. The remote management can be performed without requiring a resetting or a rebooting of the underlying operating environment. The framework also provides Dora service registry to allow detection of a change in state of services in the system (e.g., detecting new services, detecting that a service has become unavailable, etc.). On-demand service 514 can be handled via mobile service engine 530 to provide the service as possible as the mobile device is connected (OCA).

Locally deployed services are executed in an offline mode. Local offline data 540 represents data that is loaded on mobile device 510 and available locally. Offline service 516 represents any service that can be accessed locally, whether or not the mobile device is operating offline or not. In one embodiment, described in more detail below, services necessary to perform certain operations are accessed and locally stored as local offline data 540 to enable execution of an operation in an offline mode that would otherwise be performed via the asynchronous service or on-demand service mechanisms.

In one embodiment, active business client 520 includes service agent 522, which determines what services are necessary to perform an operation or execute an action. Service agent 522 can coordinate operation of the device based on the appropriate service. Thus, for example, operations that require on-demand service 514 are directed via service agent 522 to mobile service engine 530 for execution.

In one embodiment, service agent 522 is proactive or predictive in the deployment of services. Services that will be necessary to perform an operation can be accessed and provided to the user on the mobile device to enable the execution of an action. Thus, if the service is locally available, service agent 522 can provide the service. If the mobile device can connect to a backend to obtain the service, service agent 522 can trigger such an interaction between the mobile device and the backend to enable the user to perform the work. In another example, if one or more records are missing to be able to execute an action, service agent 522 can trigger the creation of the record offline, and update them once the mobile reconnects.

Figure 6:
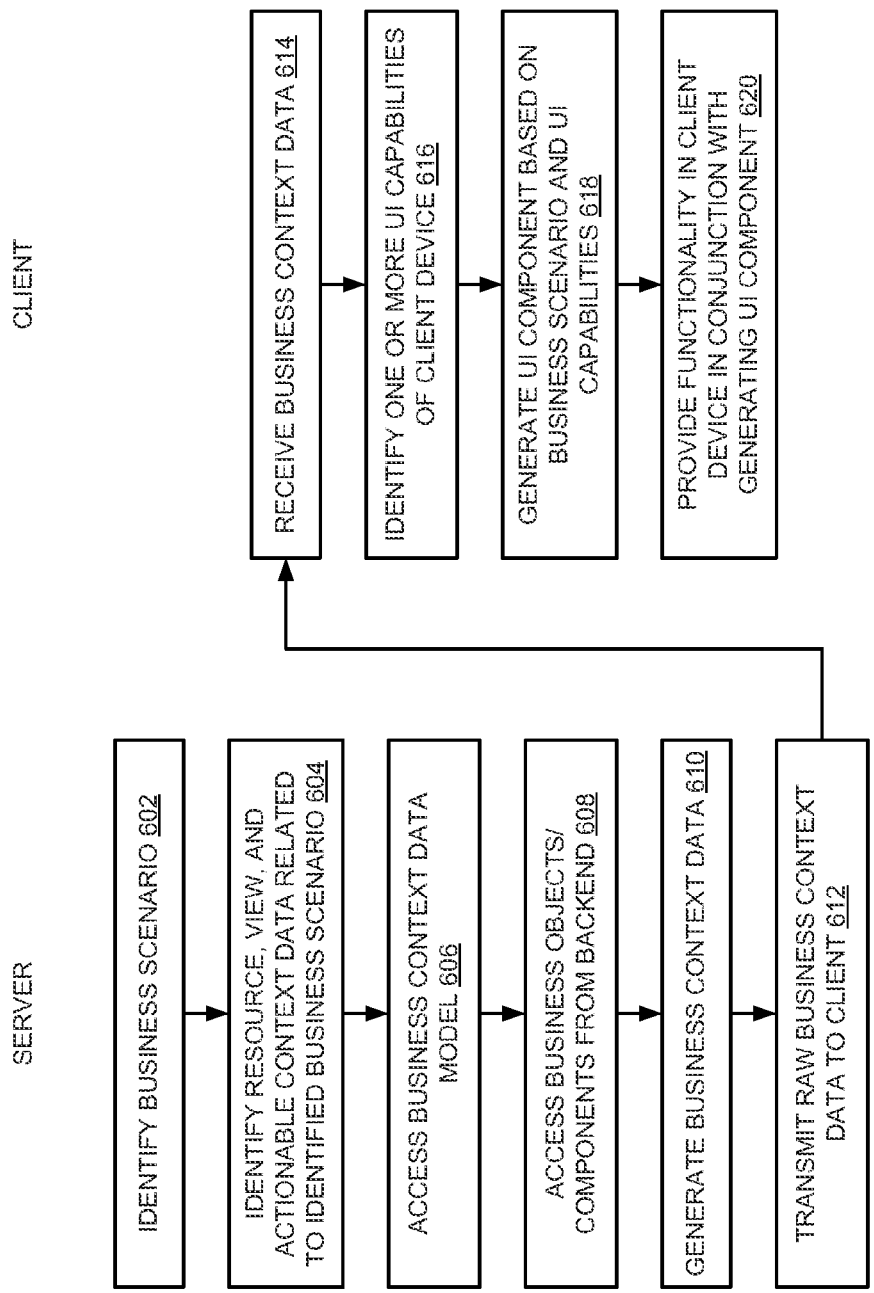
FIG. 6 is a flow diagram of an embodiment of a process for a server to send business context data to a client.

FIG. 6 is a flow diagram of an embodiment of a process for a server to send business context data to a client. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

On the server side, the server generates business context data. The server identifies a business scenario for which to create the context data, 602. In one embodiment, the business scenario can be identified in a request from the client. The server identifies a resource, a view, and actionable context data related to the identified business scenario, 604. The business scenario can be defined, for example, as a data structure or table with the associated components. The server accesses a business context data model for generating the business context data, 606. The business context data model includes rules for mapping and potentially includes specific associations with which to generate an instance of business context data.

The server accesses business objects or other data components or services from one or more backend services, 608. The accessed components can be used to generate a composite data object. The server generates the instance to create business context data, 610. The instance represents raw business context data that is not formatted to a particular user interface. The server transmits the raw business context data to the client, 612.

The client receives the business context data, 614, and processes it with an active client. The active client identifies one or more UI capabilities of the client device 616. Identifying the UI capabilities can inform the active client in making a determination of which actions/tasks should be deployed, and in determining what UI components to create to represent the data on the client device. The active client generates one or more UI components based on the business scenario identified in the business context data and based on the UI capabilities, 618. The active client renders the components in the UI, and provides functionality in the client device in conjunction with generating the UI components, 620. The UI components provide an interactive representation of the functionality, which the user can then execute.

Figure 7:
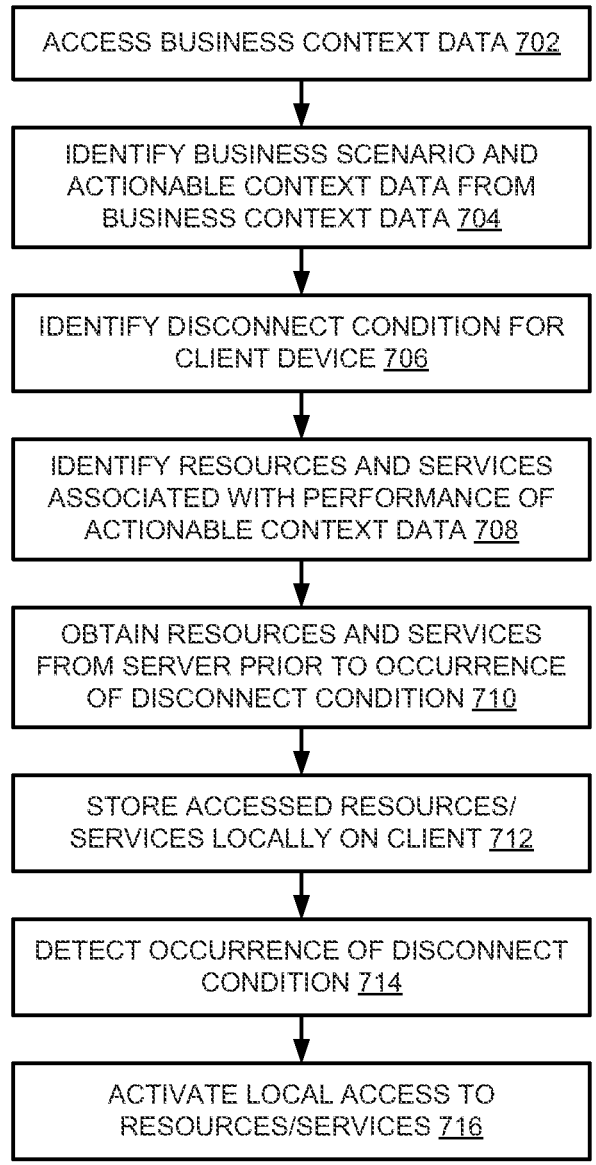
FIG. 7 is a flow diagram of an embodiment of a process for active deployment of resources based on business context data.

FIG. 7 is a flow diagram of an embodiment of a process for active deployment of resources based on business context data. An active business client accesses business context data received from a server, 702. From the business context data, the active business client can identify a business scenario and actionable context data, 704. For example, such information can be provided in a metadata description of the business context data. The active business client identifies a disconnect condition for the client device, 706. The disconnect condition can occur based on a time of day (e.g., based on an event), or some other observable condition (e.g., a connectivity session will terminate). The active business client identifies one or more resources and/or services associated with performance of the actionable context data, 708. The services can be identified based on the task itself, which can include a list of resources and services necessary to execute the task.

In one embodiment, the active business client predictively obtains the identified resources and/or services from a server prior to the occurrence of the disconnect condition, 710. Such a timing can be triggered by a scheduler where a user establishes that at a certain time the user will be going home, or leaving on a trip, or disconnecting, etc. The active business client could request such information when a particular activity is presented to the user on the client device. Based on the identified resources and the disconnect condition, the active business client obtains the resources and stores the accessed resources and services locally on the client device, 712. Storing the resources locally makes them available for offline operation.

When the active business client then detects that the disconnect condition has occurred, 714, the local resources are activated on the client device to allow local access to the resources/services, 716.

One implementation can include a method of receiving, at a client device from a server, business context data that describes a resource, a view, and actionable context data related to a business scenario; identifying user interface capabilities of the client device; and generating a user interface (UI) component based on the business scenario and the identified capabilities, the UI component enabling functionality related to the actionable context data on the client device.

The method can further include: wherein receiving the business context data that describes the resource comprises receiving business context data that describes one or more of a business object, a document, a form, a report, or an identified individual. The method can further include: wherein receiving the business context data that describes the view comprises receiving business context data that describes one or more of a data layout, an association of a graphic with a function, or a text field to display. The method can further include: wherein receiving the business context data that describes the actionable context data comprises receiving business context data that describes an activity of a workflow. The method can further include: wherein receiving the business context data related to the business scenario comprises receiving a description of the business scenario as metadata associated with the data describing the resource, the view, and the actionable context data. The method can further include: wherein receiving the business context data comprises receiving data of a model layer of a model-view-controller (MVC) architecture; and wherein identifying the user interface capabilities of the client device and generating the UI component comprise implementing the controller and view layers of the MVC architecture.

The method can further include: generating a request for a contextual action based on a context of the business context data. The method can further include: predictively deploying a service based on detecting a disconnect condition.

The method can further include: receiving a meta object having an aggregation of data elements from multiple backend systems. The method can further include: wherein receiving the meta object having the aggregation of data elements from multiple backend systems further comprises receiving the meta object having a bound data component, where the binding links the data component to one of the multiple backend systems.

A storage medium can provide content for instructions to perform operations directed to any of the operations of the method.

One implementation can include a client device comprising a network interface to connect to a server that provides a business context data stream; and an active business client to receive from the server a data stream having business context data that describes a resource, a view, and actionable context data related to a business scenario, and to identify user interface capabilities of the client device, the active business client having a controller layer to process the business context data;

and a view layer to generate a user interface (UI) component based on the business scenario and the identified UI capabilities, and to render the UI component in a UI to enable functionality related to the actionable context data on the client device.

The client device can further include: the active business client to further determine whether to make a task of the actionable context data available on the client device. The client device can further include: the active business client to selectively access one or more services based on whether the task is made available on the client device.

One implementation can include a method in a server, comprising generating business context data that describes a resource, a view, and actionable context data related to a business scenario, the business context data not specific to any particular user interface (UI) capability of a client device; and transmitting to the client device the business context data, the client device having a business client that identities capabilities of the client device and generates a UI component based on the business scenario and the UI capabilities.

The method can further include: wherein generating the business context data comprises generating data of a model layer of a model-view-controller (MVC) architecture, wherein the view and controller layers are implemented by the client device. The method can further include: wherein generating the business context data further comprises annotating an action associated with the actionable context data to indicate what resources and capabilities are necessary to execute the action. The method can further include: wherein generating the business context data further comprises accessing data components from multiple backend systems. The method can further include: wherein generating the business context data further comprises accessing a meta object model that includes mapping rules to determine how to generate an instance of a composite meta object from components accessed from the multiple backend systems.

The method can further include: generating business context data that describes a resource, a view, and actionable context data related to a business scenario, the business context data not specific to any particular user interface (UI) capability of a client device; and transmitting to the client device the business context data, the client device having a business client that identifies UI capabilities of the client device and generates a UI component based on the business scenario and the UI capabilities. The method can further include: wherein generating the business context data further comprises generating a metadata description of the business scenario; and including the metadata description in the business context data. The method can further include: wherein generating the business context data comprises generating a mashup composite data object having data components from multiple backend systems. The method can further include: wherein transmitting the business context data comprises sending an updated data component to replace one of the data components to reflect a change of the data component in its respective backend system.

A storage medium can provide content for instructions to perform operations directed to any of the operations of the method.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

identifying actionable context data of a business scenario hosted by a server, the actionable context data to be performed on a client device having particular user interface capabilities, the client device capable of operation while disconnected from the server, the business scenario providing an end business purpose for a work action;

identifying a disconnect condition indicating a likelihood that the client device will be disconnected;

automatically identifying a resource and a service associated with the actionable context data based on identifying the business scenario;

automatically accessing the resource and the service from the server while connected to the server in response to detecting the disconnect condition; and locally storing the accessed resource and service at the client device to enable performing the work action on the actionable context data while the client device is disconnected from the server.

2. The method of claim 1, wherein identifying the disconnect condition further comprises:

determining from a schedule that the client device is likely to be disconnected.

3. The method of claim 1, wherein locally storing the accessed resource and service further comprises:

activating the locally stored resource and service to enable execution of the actionable context data from local storage.

4. The method of claim 1, wherein identifying the disconnect condition further comprises:

detecting a user request to disconnect the client device.

5. The method of claim 1, wherein identifying the actionable context data comprises identifying business context data not specific to a particular user interface (UI) type, without UI model or UI pattern information in the business context data, wherein the resource includes a functional resource used to perform the work action, wherein the view includes a metadata definition of a generic presentation form to be processed to render the business context data in a UI, wherein the actionable context data includes interactive content to perform the work action and cause an action at the server, and wherein the UI type includes interface hardware and associated drivers.

6. An article of manufacture comprising a non-transitory computer readable storage medium having content stored thereon to provide instructions, which when executed cause a machine to perform operations including:

identifying actionable context data of a business scenario hosted by a server, the actionable context data to be performed on a client device having particular user interface capabilities, the client device capable of operation while disconnected from the server, the business scenario providing an end business purpose for a work action;

identifying a disconnect condition indicating a likelihood that the client device will be disconnected;

automatically identifying a resource and a service associated with the actionable context data based on identifying the business scenario;

automatically accessing the resource and the service from the server while connected to the server in response to detecting the disconnect condition; and locally storing the accessed resource and service at the client device to enable performing the work action on the actionable context data while the client device is disconnected from the server.

7. The article of manufacture of claim 6, wherein the content to provide instructions for identifying the disconnect condition further comprises content to provide instructions for
   determining from a schedule that the client device is likely to be disconnected.

8. The article of manufacture of claim 6, wherein the content to provide instructions for locally storing the accessed resource and service further comprises content to provide instructions for
   activating the locally stored resource and service to enable execution of the actionable context data from local storage.

9. The article of manufacture of claim 6, wherein the content to provide instructions for identifying the disconnect condition further comprises content to provide instructions for
   detecting a user request to disconnect the client device.

10. The article of manufacture of claim 6, wherein the content to provide instructions for identifying the actionable context data comprises content to provide instructions for identifying business context data not specific to a particular user interface (UI) type, without UI model or UI pattern information in the business context data,
    wherein the resource includes a functional resource used to perform the work action,
    wherein the view includes a metadata definition of a generic presentation form to be processed to render the business context data in a UI,
    wherein the actionable context data includes interactive content to perform the work action and cause an action at the server, and
    wherein the UI type includes interface hardware and associated drivers.

11. A client device comprising:
    network interface hardware to connect to a server that provides a business context data stream; and
    an active business client to identify actionable context data of a business scenario hosted by a server, the actionable context data to be performed on the client device with user interface capabilities specific to the client device, the client device capable of operation while disconnected from the server, the business scenario providing an end business purpose for a work action, the active business client including
       a controller layer at the mobile client device to process the business context data, including to identify a disconnect condition indicating a likelihood that the client device will be disconnected, identify a resource and a service associated with the actionable context data and access the resource and the service from the server while connected to the server in response to detecting the disconnect condition, and store the accessed resource and service locally at the client device to enable performing the work action on the actionable context data while the client device is disconnected from the server; and
       a view layer to generate the UI component based on the business scenario and based on the identified UI capabilities available on the client device and a data processing control layer at the client device, the component being specific to the UI type available on the client device, and to render the UI component in a UI to enable functionality related to the actionable context data to perform the work action in the client device.

12. The client device of claim 11, the active business client to identify the disconnect condition by determining from a schedule that the client device is likely to be disconnected.

13. The client device of claim 11, the active business client to further activate the locally stored resource and service to enable execution of the actionable context data from local storage.

14. The client device of claim 11, the active business client to identify the disconnect condition by detecting a user request to disconnect the client device.

15. The client device of claim 11, the active business client to identify the disconnect condition by identifying business context data not specific to a particular user interface (UI) type, without UI model or UI pattern information in the business context data,
    wherein the resource includes a functional resource used to perform the work action,
    wherein the view includes a metadata definition of a generic presentation form to be processed to render the business context data in a UI,
    wherein the actionable context data includes interactive content to perform the work action and cause an action at the server, and
    wherein the UI type includes interface hardware and associated drivers.

\* \* \* \* \*